United States Patent
Ulrey et al.

(10) Patent No.: US 8,403,811 B2
(45) Date of Patent: Mar. 26, 2013

(54) METHOD AND SYSTEM FOR CABIN HEATING

(75) Inventors: Joseph Norman Ulrey, Deardorn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 435 days.

(21) Appl. No.: 12/758,570

(22) Filed: Apr. 12, 2010

(65) Prior Publication Data

US 2011/0251019 A1 Oct. 13, 2011

(51) Int. Cl.
*F16H 59/64* (2006.01)
(52) U.S. Cl. .......................................................... 477/98
(58) Field of Classification Search .................... 477/98, 477/111, 113
See application file for complete search history.

(56) References Cited

U.S. PATENT DOCUMENTS

| | | | |
|---|---|---|---|
| 4,858,825 A | 8/1989 | Kawamura | |
| 5,192,021 A | 3/1993 | Meier et al. | |
| 5,678,461 A | 10/1997 | Stine | |
| 6,021,868 A | 2/2000 | Bogema | |
| 6,131,553 A | 10/2000 | Suzuki | |
| 6,360,702 B1 | 3/2002 | Osada | |
| 6,412,617 B1 | 7/2002 | Spijker et al. | |
| 6,537,178 B1 | 3/2003 | Takizawa et al. | |
| 6,695,743 B2 | 2/2004 | Tanaka et al. | |
| 6,868,668 B2 | 3/2005 | Suzuki | |
| 2005/0288150 A1* | 12/2005 | Hitch et al. | 477/98 |
| 2006/0068971 A1* | 3/2006 | Kobayashi | 477/37 |
| 2007/0295475 A1 | 12/2007 | Samie et al. | |
| 2009/0056351 A1* | 3/2009 | Dame et al. | 62/133 |
| 2010/0000475 A1 | 1/2010 | Kardos et al. | |
| 2010/0197441 A1 | 8/2010 | Pursifull | |
| 2010/0251703 A1* | 10/2010 | Takeishi et al. | 60/320 |

OTHER PUBLICATIONS

Ulrey, Joseph Norman et al., "Vehicle Fuel Burner," U.S. Appl. No. 13/035,688, filed Feb. 25, 2011, 25 pages.
Pursifull, Ross Dykstra, "Methods and Systems For Heating Transmission Fluid," U.S. Appl. No. 12/365,497, filed Feb. 4, 2009, 26 pages.
Ulrey, Joseph Norman et al., "Transmission Fluid Heating Via Heat Exchange With Engine Cylinder Walls," U.S. Appl. No. 12/892,548, filed Sep. 28, 2010, 29 pages.

* cited by examiner

*Primary Examiner* — Edwin A Young
(74) *Attorney, Agent, or Firm* — Julia Voutyras; Alleman Hall McCoy Russell & Tuttle LLP

(57) ABSTRACT

Methods and systems are provided for selectively increasing an amount of waste heat generated by an idling engine. An engine output is increased while a transmission output is locked to generate waste heat that may be used to heat the cabin of a stopped vehicle.

18 Claims, 3 Drawing Sheets

METHOD AND SYSTEM FOR CABIN HEATING

FIELD

The present description relates generally to methods and systems for expediting cabin heating during idling.

BACKGROUND/SUMMARY

A heating system coupled to an engine utilizes an engine-driven pump to circulate coolant and transfer engine heat to a heater core for heating a vehicle passenger compartment. In some vehicles, such as hybrid-electric vehicles and diesel engine vehicles, the amount of waste heat generated by the engine may not be sufficient to rapidly heat the vehicle cabin.

One example approach for selectively increasing engine heating is illustrated by Tanaka et al. in U.S. Pat. No. 6,695,743. Therein, the engagement of a torque converter lock-up clutch is adjusted based on the vehicle speed and based on a heating requirement. Specifically, when the vehicle is moving and a higher amount of heating is requested, the engagement of the lock-up clutch is restricted (or restricted more) while when a lower amount of heating is requested, the engagement of the lock-up clutch is unrestricted (or restricted less). In this way, the engine may generate increased waste heat via inefficiencies created by a disengaged torque converter.

However, the inventors herein have recognized potential issues with such an approach. As one example, if the vehicle is idling, no additional engine waste heat can be generated according to this approach. Thus, if the vehicle has an extended idle, the cabin occupants may not be provided desired cabin heat for a significant duration, which may decrease customer satisfaction.

Thus, in one example, some of the above mentioned issues may be addressed by a method of operating a vehicle engine coupled to a transmission, comprising during a vehicle stopped condition, grounding the transmission to a frame of the vehicle. The method further comprises, increasing engine output with the transmission grounded to generate increased waste engine heat. The generated waste heat may then be used to heat the vehicle cabin.

In one example, during a vehicle stopped condition, for example, when a gear shift indicator is in park or neutral a vehicle, and the engine is idling, an engine controller may be configured to lock the transmission output by grounding the transmission to a frame of the vehicle with the torque converter unlocked (for example, at least partially unlocked). Further, the engine output may be temporarily increased, by increasing a fuel injection and/or aircharge intake, to increase engine idle speed. The transmission may be grounded and the engine input may be increased in response to a cabin temperature falling below or a threshold, or in response to a vehicle occupant requesting cabin heating. The transmission may be grounded by engaging one or more transmission output shaft to transmission case clutches. By engaging such a clutch while the torque converter is unlocked, the output of the transmission may be ground to a vehicle frame, thereby transmitting substantially no torque through the transmission. At the same time, by increasing the engine output to increase an engine idle speed, the torque converter may be rotated in coordination with the higher engine idle speed, thereby generating additional waste heat. As such, during such an operation, the amount of waste heat generated through the torque converter may be directly proportional to the cube of engine idle speed. Thus, a large amount of heat may be rapidly generated by raising the engine speed input to the torque converter while transmitting substantially no torque from the transmission.

The large amount of waste heat generated in this manner may then be used for rapid cabin heating. For example, coolant may be circulated through the engine during the transmission grounding with increased engine input operation. The heated coolant may then be circulated through a vehicle cabin heating system to heat the vehicle passenger compartment. In an alternate example, transmission fluid may be circulated through the engine during the operation and the heated transmission fluid may be circulated through a heat exchanger of the vehicle cabin heating system. Additionally or optionally, the generated waste heat may be used for cold-start emission control device catalyst heating, cold-start transmission heating, or combustion stabilization during CSER. As such, if no heating is requested, the transmission and torque converter lock-up clutch may be disengaged until a vehicle re-launch is requested.

In this way, during vehicle idling conditions, a transmission output may be locked while an engine input may be increased to generate additional waste engine heat. By increasing the engine idle speed with the transmission grounded while a torque converter coupled between the engine and the transmission is unlocked, substantial amounts of waste heat may be rapidly generated. By exchanging the waste heat with a coolant of the vehicle's cabin heating system, cabin heating may be enabled even during vehicle stopped and engine idling conditions. By using existing vehicle components to provide the requested heating, the operation of auxiliary heat-producing devices may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
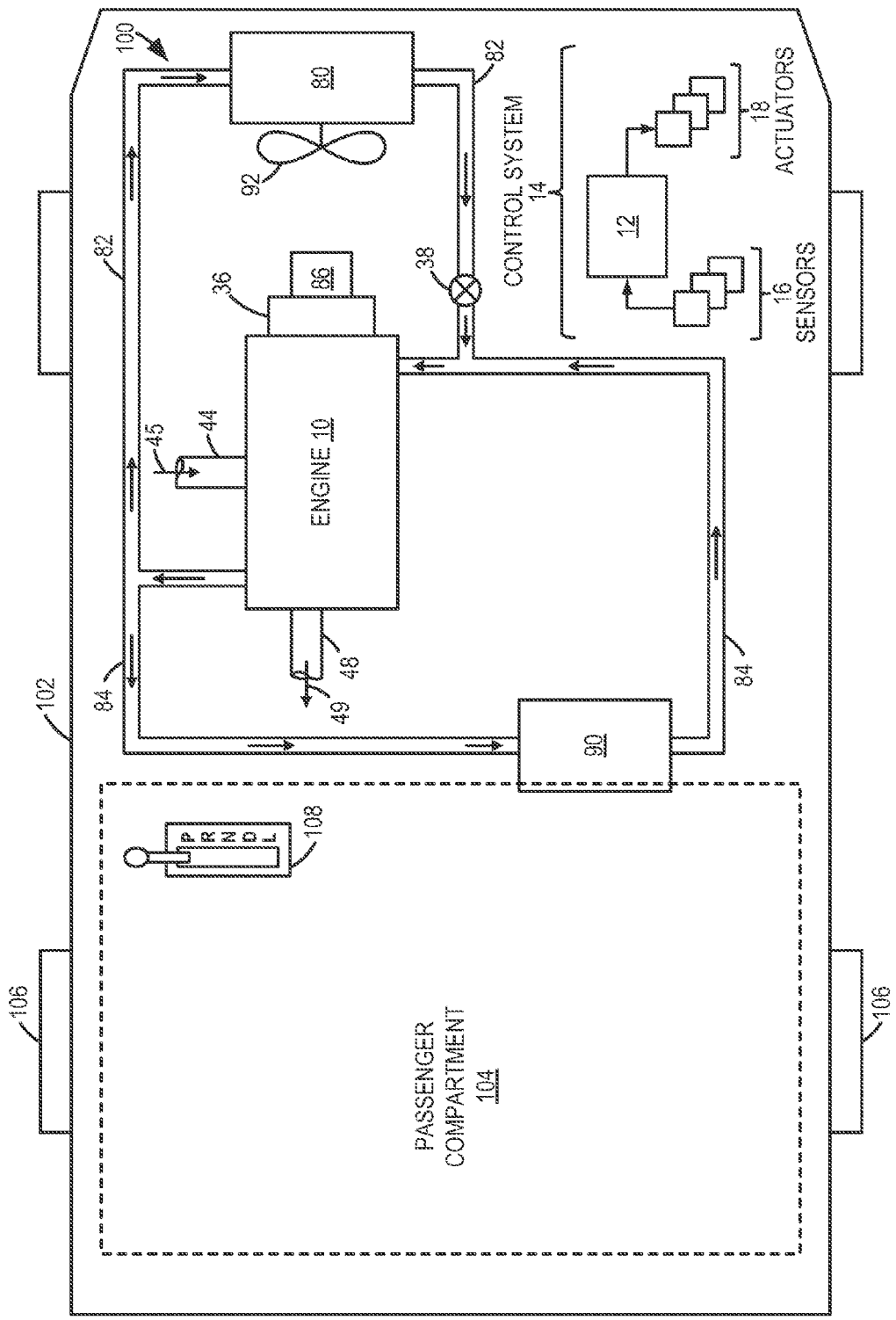
FIG. 1 schematically shows an example embodiment of a vehicle HVAC system in a motor vehicle.
Figure 2:
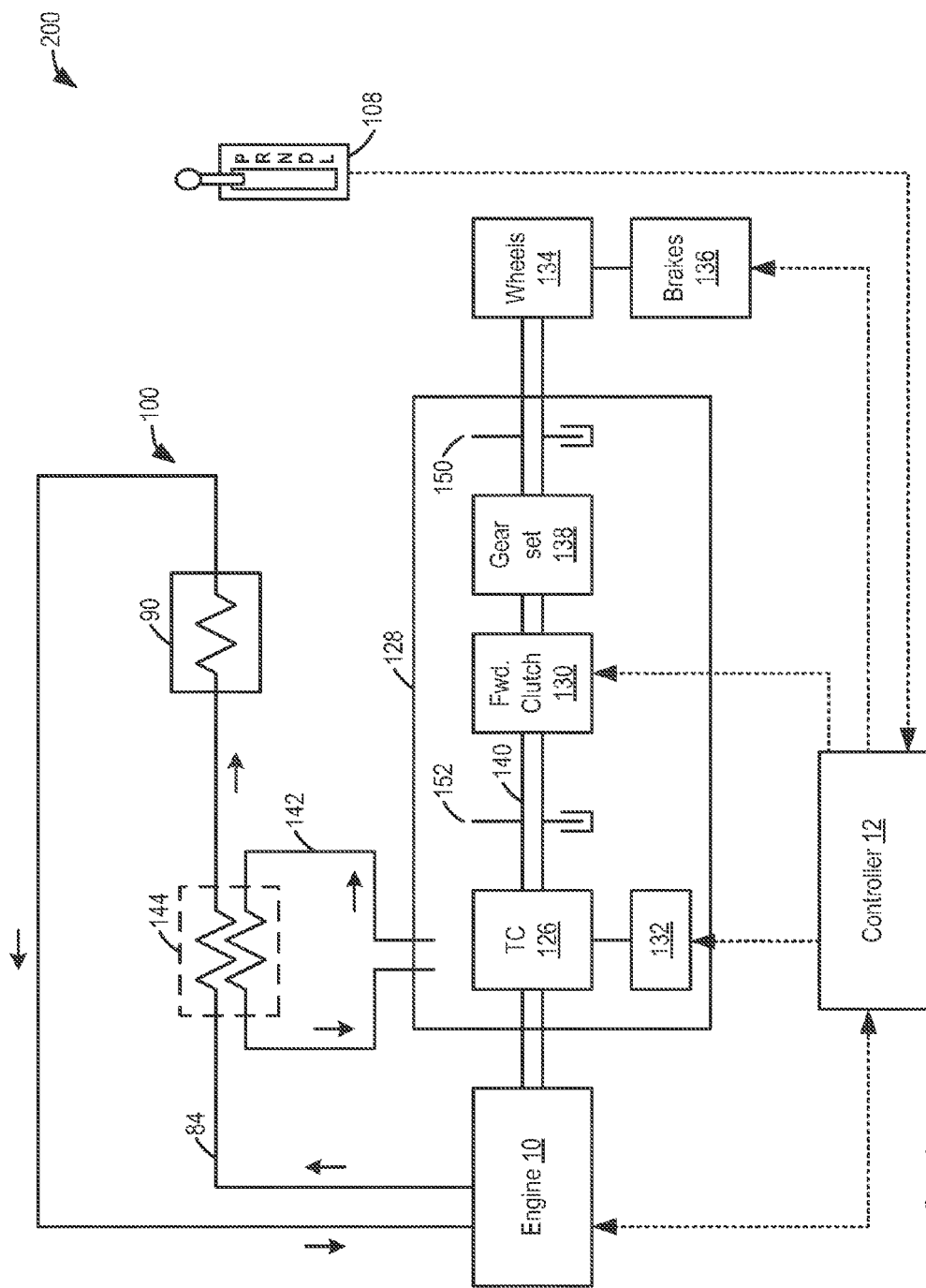
FIG. 2 shows an example embodiment of a vehicle drivetrain coupled to the heating system of FIG. 1.

The following description relates to systems and methods for generating heat when a vehicle is idling. The generated heat may be used to enable cabin heating in a vehicle HVAC system, such as shown in FIG. 1. By engaging one or more clutches, as shown in FIG. 2, a transmission and/or torque converter output shaft may be locked to the transmission case while keeping the torque converter unlocked. By increasing engine output while grounding the transmission, substantial engine idle heat may be generated. An engine controller may be configured to perform control routines, such as the routine depicted in FIG. 3, to lock transmission output while increasing engine idle speed by increasing a fuel injection and/or intake air flow to selectively increase an amount of idle waste heat. By circulating coolant through the engine during the transmission grounding operation, the waste heat may be transferred to the coolant. Heated coolant may then be circulated through a cabin heating system to enable cabin heating in an idle vehicle. Alternatively, transmission fluid may be used as the working liquid for exchanging heat with the vehicle's HVAC system.

Turning now to FIG. 1, an example embodiment of a vehicle heating, ventilation and air-conditioning (HVAC) system 100 (herein also referred to as cabin heating system) in a motor vehicle 102 is illustrated schematically. Vehicle 102 has drive wheels 106, a passenger compartment 104 (herein also referred to as cabin), and an engine compartment including an internal combustion engine 10. Internal combustion engine 10 has a combustion chamber which may receive intake air via intake passage 44 and may exhaust combustion gases via exhaust passage 48. Engine 10 as illustrated and described herein may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

HVAC system 100 circulates coolant through internal combustion engine 10 to absorb waste engine heat and distribute the heated coolant to radiator 80 and/or heater core 90 via coolant lines 82 and 84, respectively. As shown, HVAC system 100 is coupled to engine 10 and circulates engine coolant from engine 10 to radiator 80 via engine-driven water pump 86, and back to engine 10 via coolant line 82. Engine-driven water pump 86 may be coupled to the engine via front end accessory drive (FEAD) 36, and rotated in proportion with engine speed via a belt, chain, etc. Specifically, engine-driven pump 86 circulates coolant through passages in the engine block, head, etc., to absorb engine heat, which is then transferred via the radiator 80 to ambient air. In one example, where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in cooling line 82, which may be kept closed until the coolant reaches a threshold temperature.

Further, a fan 92 may be coupled to radiator 80 in order to maintain an airflow through radiator 80 when vehicle 102 is moving slowly or stopped while the engine is running. In some examples, fan speed may be controlled by a controller 12. Alternatively, fan 92 may be coupled to engine-driven water pump 86.

Hot coolant may flow through coolant line 82, as described above, and/or through coolant line 84 to heater core 90 where the heat may be transferred to passenger compartment 104, and the coolant flows back to engine 10. Heater core 90 may thus act as a heat exchanger between the coolant and the passenger compartment 104. Fins may be attached to the heater core to increase the surface area for heat transfer. Air may be forced past the fins, for example by operating a fan, to expedite heating of the passenger compartment.

In some examples, engine-driven pump 86 may operate to circulate the coolant through both coolant lines 82 and 84. In other examples, where vehicle 102 has a hybrid-electric propulsion system, an electric auxiliary pump (not shown) may be included upstream of the heater core in the HVAC system, in addition to the engine-driven pump. Therein, the auxiliary pump may be employed to circulate coolant through heater core 90 during occasions when engine 10 is off (e.g., electric only operation) and/or to assist engine-driven pump 86 when the engine is running. Like engine-driven pump 86, the auxiliary pump may be a centrifugal pump; however, the pressure (and resulting flow) produced by the auxiliary pump may be proportional to an amount of power supplied to the pump by a system energy storage device (not shown).

FIG. 1 further shows a control system 14. Control system 14 may be communicatively coupled to various components of engine 10 to carry out the control routines and actions described herein. For example, as shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), HVAC system sensors (such as coolant temperature, fan speed, passenger compartment temperature, ambient humidity, etc.), and others.

Further, controller 12 may communicate with various actuators 18, which may include engine actuators (such as fuel injectors, an electronically controlled intake air throttle plate, spark plugs, transmission clutches, etc.), HVAC system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

Controller 12 may also receive input from gear selector 108. A vehicle operator may be configured to adjust a gear of the transmission (FIG. 2) by adjusting the position of gear selector 108. In one example, as depicted gear selector 108 may have 5 positions (PRNDL gear selector), however, other embodiments may also be possible.

As noted herein, the amount of waste heat generated by the engine and transferred to the coolant may affect the amount of heat that may be transferred to the passenger compartment to provide cabin heating. For example, during engine idling conditions, the amount of waste heat generated may be proportionally reduced, thereby reducing an amount of cabin heating available. Further, during such conditions, cabin heating may be substantially slow. As elaborated herein with reference to FIGS. 2-3, during vehicle idling conditions, with gear selector 108 in P or N positions, in response to a request for cabin heating and/or in response to a passenger compartment temperature falling below a threshold, the controller may be configured to perform a transmission grounding routine. Specifically, the controller may be configured to lock transmission output while increasing engine input to thereby selectively increase an amount of waste idle heat that is generated, and circulate the waste heat through the cabin heating system via coolant. In this way, by generating waste heat during vehicle idling, HVAC system fluid heating may be expedited, thereby enabling rapid cabin heating.

Now turning to FIG. 2, an example embodiment of a vehicle drive-train 200 is shown. Drive-train 200 may be powered by engine 10. In one example, engine 22 may be a gasoline engine. In alternate embodiments, other engine configurations may be employed. Engine 10 may be started with an engine starting system (not shown), and may generate torque via a torque such as a fuel injector, throttle, etc.

The engine output torque may be transmitted via torque converter 126 to drive automatic transmission 128 by engaging one or more transmission clutches, such as forward clutch 130. As such, a plurality of such clutches may be engaged, as needed. A transmission gear may be selected from gear set 138 automatically based on the transmission forward clutch that is engaged. Alternatively, a vehicle operator may select a transmission gear by adjusting a coupled vehicle gear selector, such as gear selector 108. Torque may be transmitted from engine 10 to transmission 128 through torque converter 126, with or without torque multiplication. For example, when torque converter lock-up clutch 132 is fully disengaged, torque converter 126 may be unlocked, and engine output torque may be relayed to input shaft 140 of transmission 128 with torque multiplication. In comparison, when torque converter lock-up clutch 132 is fully engaged, torque converter 126 may be locked, and the entire engine output torque may be relayed to input shaft 140 of transmission 128 without torque multiplication. Alternatively, the torque converter lock-up clutch 132 may be partially engaged, thereby enabling an amount of torque relayed through the torque converter to be adjusted. In one example, controller 12 may adjust an amount of torque transmitted through torque converter 126 by engaging lock-up clutch 132 and controlling an amount of clutch slip. The rate of slippage may be adjusted responsive to various engine operating conditions, or for example, based on an amount of heat required for vehicle cabin heating. For example, in response to lower vehicle cabin temperatures, and/or a request for cabin heating, the controller may increase clutch slippage to increase an amount of waste heat that is generated.

Torque output from automatic transmission 128 may in turn be relayed to wheels 134 to propel the vehicle. Specifically, automatic transmission 128 may adjust an input driving force along input shaft 140 responsive to a vehicle traveling condition before transmitting an output driving force to the wheels. As such, wheels 134 may be locked by engaging wheel brakes 136. In one example, wheel brakes 136 may be engaged in response to the operator pressing his foot on a brake pedal (not shown). In the same way, wheels 134 may be unlocked by disengaging wheel brakes 136 in response to the operator releasing his foot from the brake pedal.

Controller 12 may be configured to receive inputs from engine 10 and accordingly control a torque output of the engine. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

During engine idling conditions, for example, when the vehicle is stopped with gear selector 108 in park or neutral, not enough engine heat may be produced to sufficiently warm a vehicle passenger compartment. During such a condition, in response to a request for cabin heating, engine controller 12 may be configured to lock a transmission output (with the torque converter unlocked), while simultaneously increasing engine output, thereby making heat via fluid shear through the torque converter. In one example, the transmission output may be locked by engaging one or more transmission clutches to ground the transmission output shaft to a frame of the vehicle, such as the transmission case. For example, forward clutch 130 may be grounded to the transmission case by engaging forward clutch output to transmission case clutch 150. Alternatively, the transmission output may be locked by engaging transmission forward clutch 30, and, with torque converter lock-up clutch 132 unlocked, grounding a torque converter output to transmission case clutch 152. In still other examples, both clutches 150 and 152 may be engaged.

With the torque converter lock-up clutch disengaged and the torque converter output grounded to the transmission case, the torque converter slip speed may be substantially identical to the engine speed and the heat generated may correspond to the cube of the engine speed. Thus, by rapidly increasing engine idle speed while the transmission output is kept locked, a substantial amount of idle heat can be rapidly generated.

Figure 3:
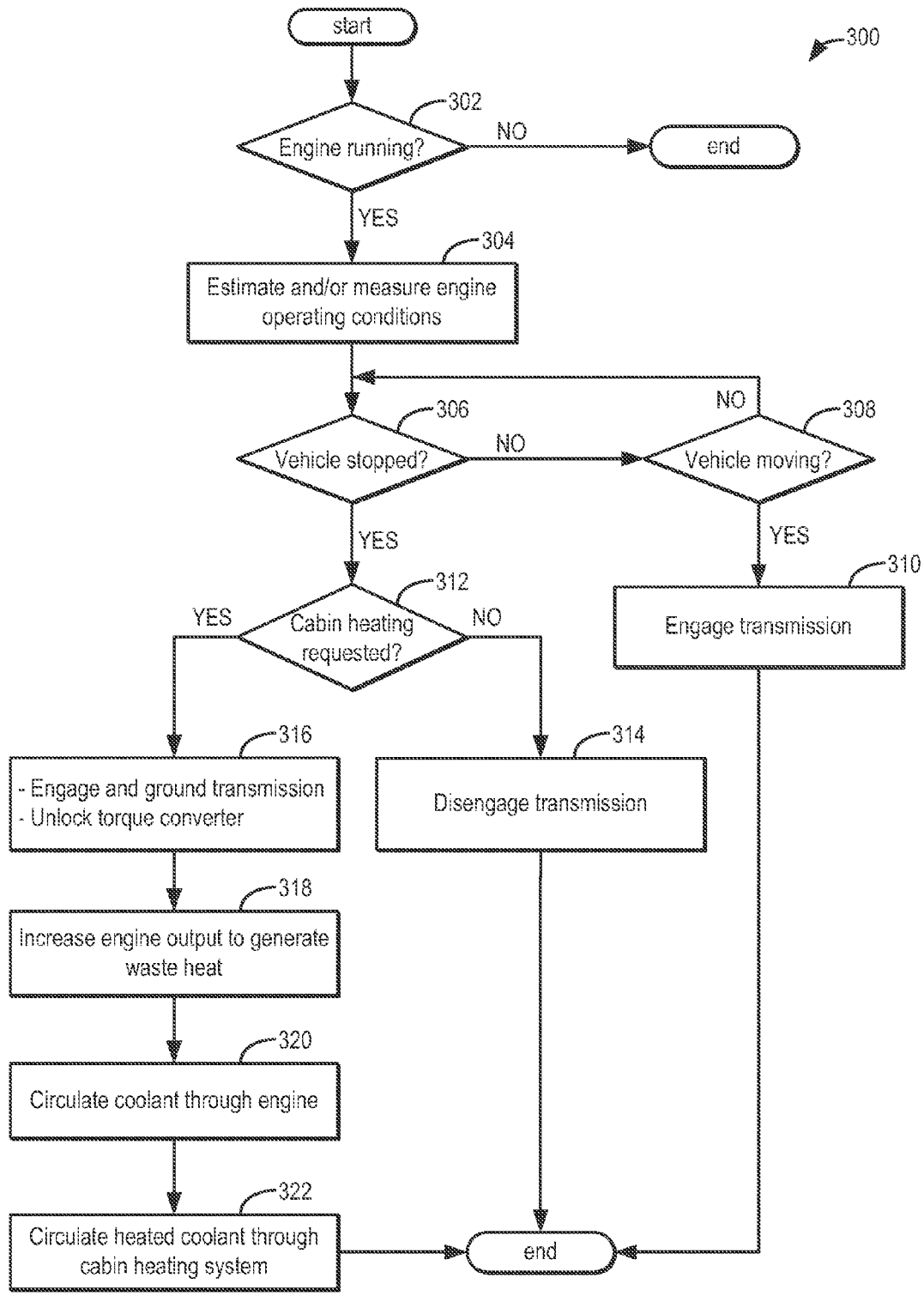
FIG. 3 shows a high level flow chart for adjusting transmission engagement responsive to a request for cabin heating, according to the present disclosure.

As elaborated herein with reference to FIG. 3, with the torque converter output and/or transmission output locked, the controller may increase engine output (for example, by increasing fuel and/or air intake) to increase an amount of waste heat generated. The generated heat may be used to heat transmission fluid in transmission fluid line 142. The heated transmission fluid may then exchange heat, via heat exchanger 144, with HVAC system 100. Specifically, heated transmission fluid may transfer heat to coolant in coolant line 84. Heated coolant may then be circulated through heater core 90 to rapidly heat a vehicle passenger compartment. Additionally, or optionally, a transmission fluid to cabin air heat exchanger may be included to directly heat the cabin with the heated transmission fluid, without heating the coolant.

Now turning to FIG. 3, an example routine 300 is depicted for selectively increasing waste heat generation during vehicle idling conditions to expedite cabin heating. By using existing transmission components, such as transmission clutches and torque converters, to generate additional heat, cabin heating may be enabled during such vehicle idling conditions without operating dedicated heating devices.

At 302, it may be confirmed that the engine is running. If the engine is not running, the routine may end. At 304, engine operating conditions may be estimated and/or measured. These may include, for example, engine speed, engine coolant temperature, catalyst temperature, MAP, BP, vehicle speed, etc. At 306, it may be determined if the vehicle is stopped. If the vehicle is not stopped, at 308, it may be confirmed that the vehicle is moving. If the vehicle is moving, at 310, the transmission may be engaged and an engine torque may be relayed to the transmission to keep moving the vehicle.

In comparison, if a vehicle stopped condition is present, at 312, it may be determined whether cabin heating is requested. In one example, the vehicle stopped condition may include the engine running (that is, idling) with a gear selector in either a park or neutral position. Cabin heating may be requested at 312 when, for example, a vehicle operator actively requests cabin heating. In another example, cabin heating may be requested when cabin temperature falls below a threshold. In still another example, cabin heating may be requested when a transmission fluid temperature falls below a threshold. If no cabin heating is requested, then at 314, the transmission maybe disengaged.

If cabin heating is requested, at 316, to selectively increase the amount of waste heat generated by the engine during the vehicle stopped condition, the controller may engage and ground the transmission to a frame of the vehicle, such as the transmission case. Further, the controller may unlock the torque converter, for example, at least partially unlock the torque converter. In one example, grounding the transmission may include locking a transmission clutch output shaft to the transmission case. For example, the controller may engage at least one of a torque converter output shaft to case clutch and a transmission output shaft to case clutch. At 318, the controller may increase engine output with the transmission grounded to generate increased waste engine heat. In one example, increasing engine output includes increasing at least one of a fuel injection and an intake aircharge amount. As such, increasing engine output includes increasing engine idle speed. Since the heat generated is proportional the cube of the engine idle speed, by increasing engine idle speed, the amount of waste heat generated can be rapidly increased. For example, as a higher amount of heat generation is requested, fuel injection and/or air intake may be adjusted to further increase engine idle speed to provide the requested heat.

At 320, coolant may be circulated through the engine during the increased engine output and grounded transmission operation. In this way, the generated heat may be exchanged with the coolant. At 322, the heated coolant may be further circulated through the cabin heating system. In this way, a vehicle cabin may be heated with the generated waste heat. It will be appreciated that while the depicted example suggests heating the coolant to heat the vehicle cabin, in an alternate embodiment, the generated heat may be transferred to transmission fluid for heating the cabin. Specifically, transmission fluid may be circulated through the engine during the increased engine output and grounded transmission operation, and the heated transmission fluid may be further circulated through the cabin heating system. For example, a heat exchanger may be configured to exchange heat between the heated transmission fluid and an HVAC system coolant.

It will also be appreciated that while the depicted example suggests grounding the transmission in response to a cabin temperature, in an alternate example, the transmission may be optionally or additionally grounded in response to a transmission fluid temperature being below a threshold. Herein, the transmission fluid heating may be advantageously used for cold-start emission control device catalyst heating, cold-start transmission heating, or combustion stabilization during CSER.

In this way, during a vehicle idling condition, with the engine idling and the vehicle stopped, in response to a drop in cabin temperature and/or a request for cabin heating, an engine controller may be configured to generate increased waste heat via inefficiencies created by a disengaged torque converter and a grounded transmission. By increasing engine output while locking the transmission output and unlocking the torque converter, substantially no torque may be transmitted through the transmission. Thus, engine idle speed may be rapidly increased and waste heat may be rapidly generated at the torque converter in proportion to the increased engine idle speed. By selectively generating heat during vehicle idling conditions, cabin heating may be enabled without operating a dedicated heating device.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of operating a vehicle engine coupled to a transmission, comprising,
during a vehicle stopped condition,
grounding the transmission to a frame of the vehicle, the transmission grounded in response to a cabin temperature; and
increasing engine output with the transmission grounded to generate increased waste engine heat.

2. The method of claim 1, further comprising circulating coolant through the engine during the increased engine output and grounded transmission operation, the coolant further circulated through a cabin heating system.

3. The method of claim 2, wherein increasing engine output includes increasing at least one of a fuel injection and an intake aircharge amount.

4. The method of claim 1, wherein the vehicle stopped condition includes the engine running with a gear selector in either a park or neutral position.

5. The method of claim 1, wherein grounding the transmission includes locking a transmission clutch output shaft to a transmission case.

6. The method of claim 1, wherein increasing engine output includes increasing idle speed.

7. A method of operating a vehicle engine coupled to a transmission, comprising: during a vehicle stopped condition, grounding the transmission to a frame of the vehicle and increasing engine output with the transmission grounded to generate increased waste engine heat, further comprising transferring the generated heat to a transmission fluid, the transmission fluid further circulated through a cabin heating system.

8. The method of claim 7, wherein the transmission is grounded in response to transmission fluid temperature being below a threshold.

9. A method of operating a vehicle engine coupled to a transmission, comprising: during a vehicle stopped condition, grounding the transmission to a frame of the vehicle and increasing engine output with the transmission grounded to generate increased waste engine heat, wherein the engine output is increased and the transmission is grounded to a frame of the vehicle while a torque converter coupled between the engine and transmission is unlocked.

10. A method of operating a vehicle engine coupled to a transmission through a torque converter, comprising,
during an engine idling condition,
locking a transmission output while increasing an engine output to generate waste heat, wherein locking the transmission output includes grounding the transmission to a frame of the vehicle with the torque converter unlocked; and
heating a vehicle cabin with the generated waste heat.

11. The method of claim 10, wherein grounding the transmission includes locking a transmission clutch output shaft to a transmission case.

12. The method of claim 10, wherein increasing engine output includes increasing fuel injection and/or increasing intake air charge to increase an engine idle speed.

13. The method of claim 10, wherein the transmission output is locked and the engine output is increased in response to a cabin temperature being below a threshold.

14. A vehicle system, comprising,
an engine;
a transmission, the transmission including one or more transmission clutches;
a torque converter coupling the engine to the transmission; and
a controller with computer readable instructions for,
during a vehicle stopped condition,
grounding a transmission output while increasing an engine output to generate heat with the torque converter at least partially unlocked; and
circulating coolant through the engine during the increased engine output and grounded transmission operation, the coolant further circulated through a cabin heating system.

15. The system of claim 14, wherein the vehicle stopped condition includes the engine idling and a vehicle cabin heating requested.

16. The system of claim 14, wherein grounding the transmission output includes grounding at least one of a transmission clutch output shaft and a torque converter output shaft to a frame of the vehicle.

17. The system of claim 16, wherein increasing the engine output includes increasing an engine fuel injection amount and/or intake aircharge amount to increase engine idle speed.

18. The system of claim 14, further comprising, circulating transmission fluid through the engine during the increased engine output and grounded transmission operation, the coolant further circulated through the cabin heating system.

* * * * *